United States Patent [19]

Fuhrer et al.

[11] 4,090,161
[45] May 16, 1978

[54] ELECTROMAGNETIC CLUTCH OR BRAKE

[75] Inventors: Egon Führer; Dieter Kleinert, both of Memmingen; Reinhard Haring, Lauben, all of Germany

[73] Assignee: Wolfgang E. Schultz, Memmingen, Germany

[21] Appl. No.: 717,183

[22] Filed: Aug. 24, 1976

[30] Foreign Application Priority Data

Aug. 29, 1975 Germany .............................. 2538494

[51] Int. Cl.² .............................................. H01F 7/08
[52] U.S. Cl. ................................... 335/281; 188/164; 192/84 C
[58] Field of Search ............... 335/281, 296, 297, 289; 188/164; 192/84 C

[56] References Cited

U.S. PATENT DOCUMENTS

| 3,055,475 | 9/1962 | Pitts | 192/84 C |
| 3,712,439 | 1/1973 | Schacher et al. | 192/84 C |

Primary Examiner—George Harris
Attorney, Agent, or Firm—Holman & Stern

[57] ABSTRACT

In electromagnetic clutches or brakes in which the armature closes against the pole pieces of the coil without leaving an air gap, the faces of the poles or armature, or both, are broken up into smaller areas by annular grooves to reduce the lodgement and retention of contaminating and magnetically inhibiting particles resulting from wear.

5 Claims, 2 Drawing Figures

ELECTROMAGNETIC CLUTCH OR BRAKE

BACKGROUND OF THE INVENTION

This invention relates to an electromagnetic control device comprising a coil, a pole ring having annular pole faces, and an armature which is attracted to said pole faces on energisation of said coil. In particular it is concerned with a device of this type which has no air gap, that is to say one in which, when the coil is energised and the armature is attracted, there is no effective air gap between the armature and the pole ring. Typical structures which may embody gapless electromagnetic control devices of this kind are electromagnetic clutches and electromagnetic brakes.

In a device of the kind set forth the two ferromagnetic parts attracted together bear against one another in the energised condition with at least temporary frictional contact. A structure of this kind has of course the advantage that in the absence of the air gap comparatively high tractive forces can be applied, which promotes the transmission of a high degree of torque.

As a rule a frictional lining is arranged between the inner pole face or faces and the outer pole face or faces of the pole ring and this, in addition to providing magnetic insulation between the two poles, has the function of providing a maximum amount of friction. In particular the friction lining is intended to keep the wear of the pole faces within tolerable limits. The friction face of the friction lining is generally uniplanar with the faces of the outer pole and the inner pole.

In the case of gapless electromagnetic clutches or brakes of the kind referred to, however, high torque can only be transmitted when the magnetically effective pole faces themselves are large, this affording optimum magnetic conditions.

It has been found that the clutches or brakes of this type initially promote the transmission of a high degree of torque but this tends to tail off quickly. Wear is found to be very marked and scoring and cold welding occur between the coacting faces. Large dimension pole faces which are so effective magnetically are therefore not in practice successful. On the other hand the pole faces cannot be made too small, the resultant magnetic forces being proportional to the area of the pole faces. As a rule a compromise is sought to give an adequate length of life but with reduced torque transmission.

The object of this invention is to avoid the need for a compromise of this kind, which cannot always be successful.

A further object is to provide an electromagnetic clutch or brake of the kind set forth which has an optimum life combined with an optimum capability of torque transmission.

BRIEF SUMMARY OF THE INVENTION

In pursuance of these objects, the present invention proposes an arrangement in which at least one of the cooperating and mutually-attracted faces is split up by at least one annular groove into a plurality of concentric faces.

The invention is based on recognition of the principle that the undesirably heavy wear or the scoring or cold welding of the pole faces by the armature occurs because detached flakes of the cooperating materials, usually for magnetic reasons of the same or similar material, or other impurities, are retained too long between the abutting faces in the case of large pole faces, and for that reason can impose a negative effect for comparatively long periods. When very small pole faces are used detached particles are eliminated quickly, for example thrown out, and only have a small or sometimes zero effect on the length of life of the structure.

If, as proposed by the invention, the comparatively large pole faces are split up into individual faces by annular grooves it is possible to use overall comparatively large surfaces, but on the other hand to keep the lodgement area for the particles relatively small.

By virtue of the large pole faces strong magnetic forces can be generated with the advantage of the large transmissable torque associated with large faces. These favourable parameters can be maintained over long operating periods because the resultant wear is no more than in existing forms of construction with comparatively small pole faces.

It is apparent that the advantages secured by the invention will be to some degree achieved even when one only of the cooperating faces is divided up into concentric ring surfaces. Depending on the structure it may be of advantage to use a number of annular grooves to produce for example three concentric annular faces. It is of advantage to provide more annular grooves in the face of the inner pole than in that of the outer pole, because the outer pole face is usually of smaller radial width in view of its larger diameter.

Generally the annular grooves are best arranged in the pole ring. This however is not absolutely essential. The annular grooves may in fact in appropriate cases be arranged in the armature with the same successful result, even although the armature generally has to be made of smaller dimensions for constructional reasons.

In accordance with a further feature of the invention special pole shoes may be provided to receive the annular groove or the annular grooves. These pole shoes may be arranged on the pole ring. The same considerations apply as regards the arrangement in the armature. By the use of special pole faces or pole shoes, having for example a comb-type form in cross section, it is possible, in the zone of the mutually applied and frictionally engaging surfaces to use special material which can be chosen to meet the required wear characteristics. Since the pole faces or pole shoes only represent short parts of the magnetic circuit, the material concerned may not even be of favourable magnetic quality.

In another feature of the invention a friction lining may be provided between the inner pole ring and the outer pole ring, or even in other places, in the manner known per se, this lining having substantially the same function as in known clutches or brakes. The invention can however be used with clutches or brakes which do not have a friction lining of this nature.

In another feature of the invention the annular groove or grooves are filled with a plastic mass. This mass has in essence the function of absorbing the detached flakes, particles or the like and even material which has been provided at the inter-rubbing surfaces to keep the frictional effects between rubbing metal surfaces as constant as possible.

In a modification of the invention the annular groove or the annular grooves may accommodate a friction lining which cooperates with the corresponding face of the armature, as is per se known in clutches or brakes of this kind. The friction lining can also be provided in an annular groove in the armature.

It has to be pointed out that annular grooves in the pole faces have been used before, but in these known cases the grooves in the pole faces have the function of limiting the effective area of the pole face not that of dividing the pole face into a plurality of annular surfaces.

BRIEF DESCRIPTION OF THE DRAWINGS

Three embodiments of the invention are diagrammatically illustrated in the accompanying drawings in which:

FIG. 3 is a part-section through a modified form of electro-magnetic brake.

Figure 1:
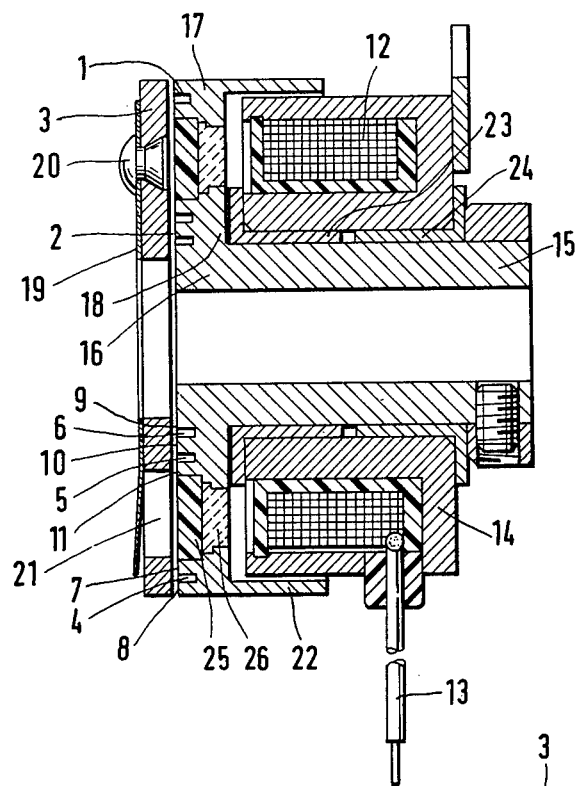
FIG. 1 is a section through an electromagnetic clutch constructed in accordance with the invention.

The electromagnetic clutch illustrated in FIG. 1 has no air gap and a slip ring is absent, that is to say the coil 12 with its connection lead 13 does not rotate but is arranged in a stationary coil housing 14 in which is arranged a tubular part 15 of the pole ring 16.

This pole ring 16 primarily comprises an outer pole 17 and an inner pole 18 and the face 1 of the outer pole incorporates a groove 4 which divides the outer pole face 1 into annular faces 7 and 8. The inner pole face 2 in the embodiment illustrated in the drawing has two annular grooves 5 and 6 forming the concentric ring faces 9, 10 and 11. The armature 3 is arranged opposite pole faces 1 and 2 and is connected to a spring 19 by rivets 20. The head of a rivet for attaching the spring 19 to the structure carrying armature 3 is received in a recess 21.

When the coil 12 is energised, the magnetic flux acts as follows. The lines of force from the coil housing 14 pass into the tubular part 22 and thence to the outer pole 17. The magnetic lines of force pass through the annular faces 7 and 8 into the armature 3 and thence via the ring faces 9, 10 and 11 again into the inner pole 18. The coil housing 14 is reached through bearing elements 23 and 24.

A friction lining 25 is carried on pole ring 16 between outer pole 17 and inner pole 18 and the annular part 26 provides a mechanical connection between inner pole 17 and outer pole 18, but effecting magnetic separation of these two.

Figure 2:
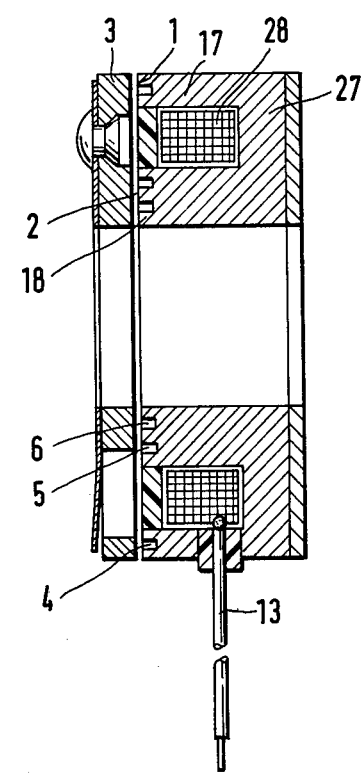
FIG. 2 is a similar section through an electromagnetic brake falling within the invention.

In the embodiment illustrated in FIG. 2 the coil housing 27 is at the same time a pole ring with an outer pole face 1 and an inner pole face 2. The pole face system corresponds to that illustrated in the embodiment of FIG. 1 and the armature 3 has the same function and construction as in the first embodiment.

Further as shown in FIG. 3 the annular grooves 4', 5' and 6' can be formed in the armature rather than in the pole ring and can be filled with a mass of plastics material.

We claim:

1. An electro-magnetic control structure comprising an armature having an armature face, a pole ring having an inner pole and an outer pole, said inner and outer poles having inner and outer annular pole faces respectively, each facing said armature face across an air gap, a coil associated with the pole ring for attaching said armature to said pole faces on energization of the coil by creation of a magnetic flux path extending through one of said poles to and directly through the armature and returning through the other of said poles, at least one of said pole and armature faces being split up by at least one annular groove into a plurality of concentric sections on opposite sides of said groove in each of which sections the direction of magnetic flux is the same when the coil is energized.

2. An electromagnetic control structure according to claim 1 in which the inner pole face has at least two annular grooves and the outer pole face has at least one annular groove.

3. An electromagnetic control structure according to claim 1, in which annular grooves are provided in the armature face.

4. An electromagnetic control structure according to claim 1, in which the at least one annular groove is filled with a mass of plastics material.

5. An electromagnetic control structure according to claim 1, in which a friction lining is provided between said pole faces.

* * * * *